United States Patent

[11] 3,550,988

| [72] | Inventors | Robert C. Schenck, Jr.;<br>Robert S. Storms, Dayton, Ohio |
|---|---|---|
| [21] | Appl. No. | 682,179 |
| [22] | Filed | Nov. 13, 1967 |
| [45] | Patented | Dec. 29, 1970 |
| [73] | Assignee | The Duriron Company, Inc.<br>Dayton, Ohio<br>a corporation of New York |

[54] PISTON AND PTFE RING ASSEMBLY FOR ENGINES
10 Claims, 6 Drawing Figs.

[52] U.S. Cl...................................................... 277/63,
277/144, 277/162
[51] Int. Cl....................................................... F16j 9/00;
F02f 5/00; F16i 15/00
[50] Field of Search........................................... 277/144,
58, 63, 143, 145, 162, 192, 198

[56] References Cited
UNITED STATES PATENTS

| 2,080,579 | 5/1937 | Schaub.......................... | 277/144 |
| 2,376,147 | 5/1945 | Johnston ...................... | 277/144 |
| 3,166,832 | 1/1965 | Scannell........................ | 277/188X |

FOREIGN PATENTS

| 1,056,145 | 1/1967 | Great Britain................ | 277/162 |
| 5,525 | 3/1903 | Great Britain................ | 277/144 |

*Primary Examiner*—Samuel Rothberg
*Attorney*—Marechal, Biebel, French & Bugg

ABSTRACT: A continuous compression seal ring of filled polytetrafluoroethylene is used in conjunction with an expander ring for conformationally and sealingly engaging the cylinder to reduce blowby. The seal ring is pentagonal in cross section and urged into sealing engagement with the piston and cylinder by an expander ring of trapezoidal cross section during reciprocating movement of the piston.

PATENTED DEC 29 1970  3,550,988

INVENTORS
ROBERT C. SCHENCK, JR. &
ROBERT S. STORMS
BY Marechal, Biebel, French & Bugg
ATTORNEYS

PISTON AND PTFE RING ASSEMBLY FOR ENGINES

Reference is also made to application Ser. No. 682,156 filed of even date herewith, now U.S. Pat. No. 3,550,988 and assigned to the same assignee as this application.

FIELD OF INVENTION

This invention relates to a piston and ring assembly for engines and more particularly to an improved piston and ring assembly utilizing filled fluorocarbon wedge rings as the primary compression seal rings.

DESCRIPTION OF THE PRIOR ART

Various approaches have been taken to adapt polytetrafluoroethylene (PTFE) for use as an element in piston rings for compressors, and in internal combustion engines, for example, gasoline and diesel engines. U.S. Pat. No. 2,807,511 issued Sept. 24, 1957, describes a metallic split piston ring in which the outer cylinder side surface of the ring is coated with PTFE, the coating being relatively thin and not exceeding 0.007 inch thickness. The purpose of the coating is to reduce friction thereby decreasing wear and increasing engine efficiency. U.S. Pat. No. 2,817,562 issued Dec. 24, 1957, describes a piston wherein the sidewalls or skirts and the face of the piston include a coating of PTFE, the coating being relatively thin and not exceeding 0.007 inch thickness. Again, the purpose of the coating on the sidewalls or skirts is to reduce friction thereby decreasing wear and increasing engine efficiency. The face of the piston is coated with a relatively thin PTFE coating to prevent deposition of carbonaceous material on the piston face.

The Journal of Teflon* E.I. duPont de Nemours Co., Inc. Vol. 7, No. 7 of Nov. 1966, describes a glass filled PTFE piston ring for use in diesel engines. Glass filled PTFE was used because rings of the filled resin appeared to have the necessary strength, durability and seal characteristics. The rings used were split, step-cut compression rings mounted on a piston in combination with steel expander rings positioned concentrically within the compression rings to force them against the cylinder wall. Several different tests are described in which glass filled PTFE rings were substituted for one or more conventional cast iron rings in a diesel engine.

In the Journal of Teflon* E.I. duPont de Nemours Co., Inc. Vol. 2, No. 10 of Oct. 1961, piston rings for compressors and rod packings are described wherein the rings are PTFE filled with glass, carbon or metallic powders. Several different ring structures are described including split, butt-joint, step-cut, and segmented piston rings, all formed of filled PTFE.

"Fluor" Engineering News No. 664 of Imperial Chemical Industries, Ltd., describes filled PTFE rings for compressors used in cryogenic refrigerators. The object in using PTFE is to eliminate the use of lubricating oils which act as a contaminant.

In the design of piston and ring assemblies for modern high-compression engines, precautions are taken to reduce oil consumption and reduce crankcase emissions resulting from blowby. Various approaches have been taken including use of different piston ring configurations with faces of various materials such as molybdenum and chromium, refining the bore finish and using rings of different configuration and having special facings which are disposed axially along the piston. Automotive engines generally utilize three ring pistons, the two upper rings being compression rings while the third is an oil ring. The compression rings are designed to prevent excessive gas leakage past the piston and to aid the oil control ring in preventing excessive oil consumption.

Various compression ring designs have been used and are proposed for modern automotive engines, and reference is made to "Automotive Piston Rings 1967—State of the Art" published by the Society of Automotive Engineers as Release No. 670019. Reference is made thereto for consideration of various configurations and facings utilized in the design of piston rings.

Even with the progress being made in piston ring design, there is considerable concern because of emissions created by blowby, that is, passage of exhaust gases around the piston and ring assembly and into the crankcase and release of these chemical products into the atmosphere through the breather tube on the crankcase. Attempts to eliminate crankcase emissions have resulted in the use of a bypass tube which is connected between the breather tube and the intake manifold so that the combustible products from the crankcase are substantially completely consumed.

It has also been observed that one of the effects of blowby is the contamination of crankcase oil by the combustion products. That is, the oil reacts with the combustion products to form water, acids and sludge, all of which are harmful to engine components.

Even with piston and ring assemblies which are carefully designed with respect to the cylinder into which they are to be received, there are inevitably areas, during the stroke of the piston, in which there is incomplete sealing either because of flat spots or out-of-round spots either on the piston rings or cylinder wall. Additionally, the conventional piston rings are split and of the expander type and have a tendency to "float" as the piston changes direction during the cycle. As a result of the combination of the split ring, slight mismatch between the piston ring and bore, and the leakage path present as a result of the floating condition of the rings, blowby and crankcase emissions have become a major air pollution problem.

Essentially the same problem exists with compressors wherein the ring seals on the piston seal to the cylinder wall and prevent passage of oil to the compression chamber, or wherein the seal rings of PTFE are used as self-lubricating seal rings.

SUMMARY OF THE INVENTION

Accordingly, it is a primary object of the present invention to provide a piston and ring assembly for an engine utilizing as a compression ring an annular continuous wedge ring of filled fluorocarbon resin in order to provide a seal preventing blowby.

Another object of the present invention is the provision of a compression ring for use with a piston in an internal combustion engine wherein the wedge ring is of filled PTFE and cooperates with an expander ring which forces the wedge ring outwardly and against one wall of the compression ring groove for substantially reducing the passage of combustion gases into the crankcase.

A further object of the present invention is the use of wedge-shaped compression rings in cooperation with metallic expander rings wherein the compression rings are received in conformational sealing engagement with the cylinder wall during reciprocating movement of a piston.

These and other objects of the present invention have been achieved by the provision of a piston ring of filled PTFE which is continuous in nature, that is, free from radial seams or joints, so that there is no path for leakage. The piston ring is preferably a compression ring of wedge-shape and cooperates with a metallic expander ring wherein the expander ring is concentrically within the compression ring and which operates to wedge the compression ring into sealing engagement with the piston ring groove during reciprocating movement of the piston and to urge the compression ring radially outwardly thereby overcoming the tendency of the ring to contract away from the cylinder wall during temperature changes. The compression chamber pressure operates to force the ring radially outwardly against the cylinder thereby assuring an efficient gas seal. Since the compression seal ring is of filled PTFE, there is little, if any, abrasive wear of the ring against the cylinder wall.

Each of the compression rings in accordance with the present invention includes a continuous outer peripheral face which conformationally engages the cylinder wall because of the radially outwardly directed force created by its wedge configuration. The compression ring also includes a pair of continuous radially disposed surfaces one of which seals against the piston body and the other of which is spaced from the wall of the ring groove to provide an expansion space. One or more such rings may be used on a piston, and, in the case of an internal combustion engine, operate to reduce substantially the amount of blowby.

DETAILED DESCRIPTION OF THE INVENTION

Figure 1:
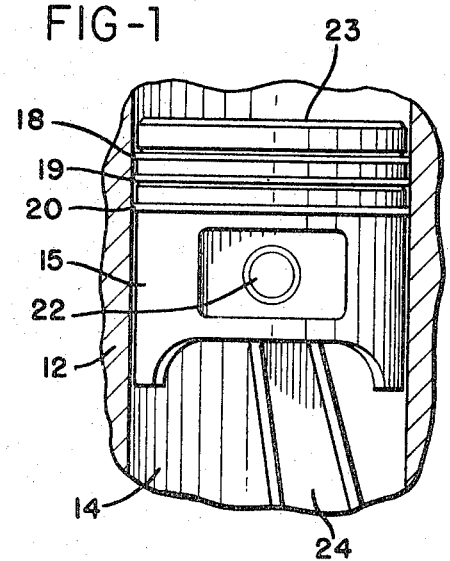
FIG. 1 is a view partly in section and partly in elevation of a piston and ring assembly in accordance with the present invention.

Referring to FIG. 1, a fragmentary section is shown of a machine such as an internal combustion engine, a compressor, or a diesel engine and the like including a block 12 which is provided with a cylinder 14 receiving a reciprocating piston 15.

The piston 15 includes two annular compression rings 18 and 19, and optionally an oil ring 20, depending on the nature of the engine. All of the rings 18–20 are positioned between the connecting rod joint 22 and the piston head 23, and as shown, the piston includes a connecting rod 24 for connection to a shaft in a conventional manner.

Figure 2:
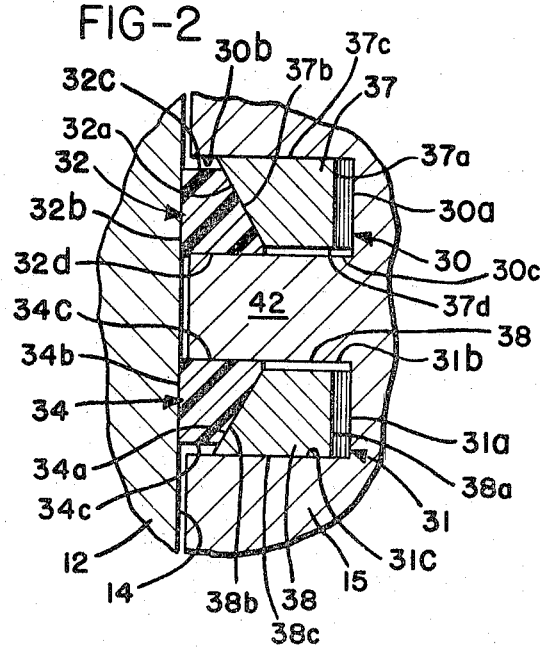
FIG. 2 is an enlarged fragmentary view of the piston and ring assembly shown in FIG. 1.

For purposes of explanation, the invention will be described with reference to an internal combustion engine, although it is understood that the principles thereof are applicable to other machines such as compressors and the like. Referring specifically to FIG. 2, the piston 15 includes two compression ring grooves 30 and 31 each of which receives a compression ring 32 and 34, respectively. Each compression ring groove includes a base 30a and 31a and radially extending spaced sidewalls 30b, 30c and 31b and 31c. Each of the compression rings 32 and 34 are annular and continuous in nature, that is, free of radial seams and joints. These rings are made of a fluorocarbon resin such as polytetrafluoroethylene (PTFE) which is filled with any of the conventional filler materials previously described above. By way of example, and not to be construed as a limitation on this invention, the rings 32 and 34 contain 55 percent by weight of 325 mesh cast iron powder.

These compression rings operate to provide a seal between the cylinder wall 14 and the piston 15 in order to prevent as much as possible, passage of exhaust gases around the outer periphery of the piston 15. If used, an oil ring functions essentially as a wiper ring to force oil back into the crankcase (not shown) during each downward stroke of the piston. Even though filled PTFE is used for the rings 32 and 34, these compression rings are sufficiently conformable to the bore or wall 14 to be urged into tight-sealing engagement therewith.

Associated with each of the compression rings 32 and 34 and positioned in each of the grooves 30 and 31 is an expander ring 37 and 38, respectively, which forms resilient means urging the associated compression rings radially outwardly during temperature fluctuation into conformational sealing engagement with the opposed portion of the cylinder bore or wall 14. As shown (FIG. 6) the expander rings are generally trapezoidal in cross section and include inner and outer peripheral surfaces 37a, b and 38a and b, respectively. The inner peripheral surface of each expander ring is spaced from the base of the associated compression ring groove.

Figure 3:
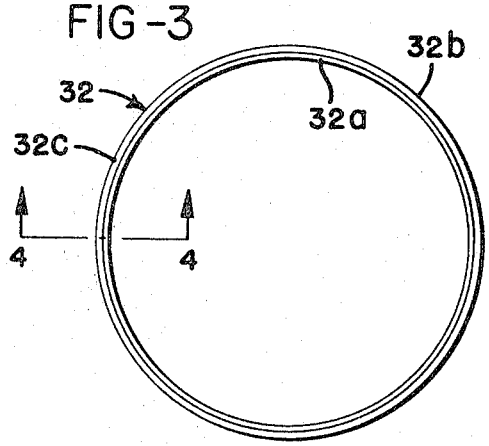
FIG. 3 is a plan view of a filled polytetrafluoroethylene compression ring in accordance with the present invention.
Figure 4:
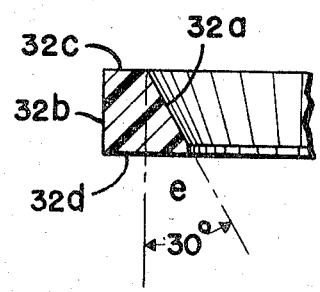
FIG. 4 is a sectional view taken along the lines 4—4 of FIG. 3.

Compression ring 32 is substantially the same in configuration as ring 34 and, as shown in FIGS. 2—4, is generally trapezoidal in cross section and cooperates with the associated expander ring to form a wedge-type seal. The ring 32 includes inner and outer peripheral surfaces 32a and 32b, respectively, each of which is continuous and free of breaks, seams or joints. The inner surface 32a of the ring is inclined, spaced from the base of the associated groove, and in sealing engagement with the opposed outer peripheral tapered surface of the associated expander ring. As shown, the compression rings 32, 34 each include spaced radial surfaces 32c, d and 34c, d, surfaces 32c and 34c being shorter in radial dimension than the faces 32d and 34d.

Figure 5:
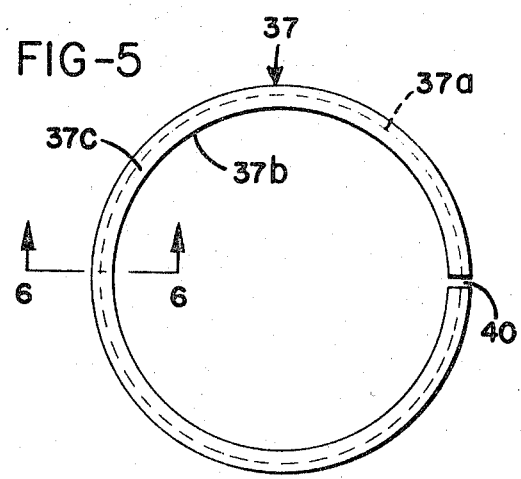
FIG. 5 is a plan view of a metallic expander ring for use in the piston and ring assembly of the present invention.
Figure 6:
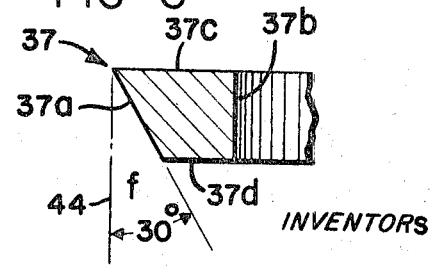
FIG. 6 is a sectional view taken along the lines 6—6 of FIG. 5.

Referring to FIGS. 5 and 6, the expander ring configuration is shown and since ring 37 is essentially the same as 38, the description thereof will be made with respect to reference ring 37. In addition to peripheral faces 37a and b, the ring includes spaced radial faces 37c and d, face 37c having a longer radial dimension than face 37d. As shown in FIG. 4, the expander ring is metallic and split as at 40 as opposed to the compression rings 32, 34 which are continuous and of filled PTFE. The expander ring is positioned generally concentrically within the associated compression ring so that the tapered outer peripheral surface thereof contacts the tapered inner surface of the associated compression ring.

As shown in FIG. 2, compression ring 32 is so positioned in ring groove 18 that the radial face 32c is spaced from sidewall 30b while the longer radial face 32d is in sealing relation with groove sidewall 30c. The outer peripheral surface 32b of this ring is in conformational sealing engagement with the bore 14 while the inner surface 32a is in sealing engagement with the outer surface 37a of the expander ring. Additionally, radial face 37c of the expander ring is in sealing engagement with the sidewall 30b of the groove, while face 37d is spaced from the sidewall 30c. Because PTFE expands at a greater rate than most metals, an annular expansion space is provided between the inner surface 37a of the expander ring and the base 30a of the groove. As the temperature increases, the compression ring tends to expand axially and radially. Due to the wedge-type seal arrangement, the ring 32 is urged radially outwardly toward the bore and downwardly toward the wall 30c by the associated expander ring 37. As the temperature decreases, tight-sealing engagement is again maintained by the expander ring 37 which urges the ring 32 radially outwardly and downwardly toward the connecting rod by virtue of the wedge-type seal. A metal-to-metal seal also exists between face 37c of the expander ring and wall 30b of the groove.

Essentially the same seal conditions exist with respect to ring 34 and associated expander ring 38 with the exception that the longer face 34d of the ring is in facing relation to face 32d, and both of the longer radial faces of rings 32 and 34 seal against the common land 42 which separates grooves 30 and 31.

The "floating" condition of the rings is substantially eliminated by the wedge-type seal configuration which maintains the compression rings sealed against the bore wall and opposed groove walls. During downward movement of the piston, ring 34 is urged into tight-sealing engagement with wall 31b and the bore wall by the expander ring and the inertia of the ring as the piston moves. Also, the pressure from the cylinder chamber which passes between the upper portion of the piston 15 and the wall acts on the narrow face 32c urging face 32d into sealing engagement with wall 30c. When the piston moves in the upward direction, the expander ring 37 and the inertia of ring 32 establishes a seal between face 32d and wall 30c while the wedge arrangement forces the outer peripheral surface 32b of the ring into tight-sealing engagement with the wall 14.

Representative dimensions of the rings and associated elements in accordance with the present invention may be understood with reference to the following example in which a piston ring and ring assembly were fabricated for installation in an internal combustion engine identified as a Ford V-8 289 engine. The bore diameter is 4.001 inches with a piston diameter of 3.965 inches. The diameter of the base of the groove on the piston is 3.525 inches with a compression ring groove width of .0128 inch. The land 42 is 0.140 inch wide. The compression ring outside diameter is 4.020 inches ± .005 inch with an inner diameter of 3.800. Face 32b of the compression rings is .110 inch ± .003 inches while face 32c is .050 inch ± .003 inch. Referring to FIG. 4, surface 32a is at an angle of 30° defined as the included angle e between the inner peripheral surface 32a and a line parallel to face 32b with the apex of the angle being at the inner section of the inter peripheral face 32a and radial face 32c.

The expander ring outside diameter is 3.908 inches with an inside diameter of 3.618 inches ± .005 The ring width, that is, dimension between faces 37b and c is .124 inch ± 0.002 inch while the dimension of face 32c is .145 inch ± .003 inch. Surface 37a is at an angle of 30° (FIG. 6) and defined as the angle f subtended between surface 37a and reference line 44 which defines the normal outside diameter of the ring. The split 40 of the ring measures .040 inch ± .005 inch.

Tests of the piston ring as above described were conducted on a Ford "Ranchero" automobile. A gas meter measuring cubic feet of gas was attached to the breather tube on the crankcase. An engine with conventional rings was used and the automobile driven at 70 m.p.h. The meter measured 76 cubic feet of gas per hour. The same engine in the same automobile was equipped with rings of the present invention and tested in the same manner and the reading was 1.5 to 2 cubic feet of gas per hour.

While the principles of the present invention have been explained with reference to piston rings for an internal combustion engine, it will be apparent to those skilled in the art that this invention is also applicable to pistons for compressors and hydraulic devices and the like.

While the forms of apparatus herein described constitute preferred embodiments of the invention, it is to be understood that the invention is not limited to these precise forms of apparatus, and that changes may be made therein without departing from the scope of the invention which is defined in the appended claims.

We claim:

1. A piston and ring assembly for use in a machine including a cylinder wherein said piston includes a head and a cylinder body portion and means for mounting the piston on a connecting rod for reciprocating movement in a cylinder, said body portion including at least one compression ring groove between said head and said means for connecting said piston to a rod, said groove including a base and radially extending spaced sidewalls, the improvement comprising a compression ring received in said compression ring groove, said compression ring being a continuous annular wedge ring of filled fluorocarbon resin material and including inner and outer peripheral surfaces and spaced radial surfaces, one of the spaced radial surfaces of said compression ring being spaced from the facing sidewall of said compression ring groove, said inner peripheral surface being in spaced relation to said base of the corresponding compression ring groove, expander means positioned concentrically within said compression ring groove between said inner peripheral surface of said compression ring and said base of said compression ring groove, said expander means including an outer peripheral surface contacting the inner peripheral surface of the corresponding compression ring for urging it radially outwardly to provide sealing engagement between the outer peripheral surface of the compression ring and the opposed portion of the cylinder and for establishing a seal between the inner peripheral surface of the compression ring and the outer peripheral surface of said expander means, said expander means including an inner peripheral surface spaced from the base of said groove, and said compression ring including a continuous outer peripheral surface for reception in conformational gas sealing relation with a cylinder wall during reciprocating movement of said piston.

2. A piston and ring assembly as set forth in claim 1 wherein said compression ring is of filled polytetrafluoroethylene.

3. A piston and ring assembly as set forth in claim 2 wherein the inner peripheral surface of each said compression ring is inclined to form a compression ring which is trapezoidal in cross section, said expander means being a split metallic ring of trapezoidal cross section and including an outer peripheral surface which is inclined and in contact with the inner peripheral surface of the corresponding compression ring to urge said compression ring into sealing engagement with said cylinder and one wall of said compression ring groove.

4. A piston and ring assembly as set forth in claim 1 wherein the radial dimension of the radial surfaces of said compression ring are different, the said radial surface of lesser radial dimension being spaced from the opposed sidewall of the associated groove, said expander means being a split metallic ring including an outer peripheral surface in contact with at least a portion of the opposed inner peripheral surface of the corresponding compression ring for urging the outer peripheral surface of the compression ring into wiping gas sealing relation with said cylinder.

5. A piston and ring assembly as set forth in claim 1 wherein said piston includes at least two compression ring grooves, and each said groove receiving one of said compression rings and one of said expander means.

6. A piston and ring assembly as set forth in claim 4 wherein said piston includes at least two compression ring grooves, each said groove receiving one of said compression rings and one of said split metallic rings, and said compression rings being so arranged in said grooves that the said surface of smaller radial dimensions are in spaced relation and facing in opposite directions.

7. A piston and ring assembly as set forth in claim 4 wherein said split metallic spacer ring is trapezoidal in cross section and includes spaced radial surfaces of different radial dimensions, the said face of lesser radial dimension being spaced from the opposed sidewall of said compression ring groove, and at least the major portion of the outer peripheral surface of said metallic ring being in radially outwardly urging engagement with a major portion of the peripheral surface of the associated said compression ring for urging the outer peripheral surface of the compression ring into conformational sealing engagement with the cylinder and for urging the said radial surface of larger radial dimension into sealing engagement with the opposed sidewall of the associated compression ring groove.

8. A piston and ring assembly as set forth in claim 1 wherein said compression ring is trapezoidal in cross section, said spaced radial surfaces being generally parallel, and said expander means being a split metallic ring of trapezoidal cross section.

9. A piston and ring assembly as set forth in claim 8 wherein said compression ring is of filled polytetrafluoroethylene.

10. A piston and ring assembly as set forth in claim 4 wherein said compression ring is of filled polytetrafluoroethylene.